(12) United States Patent
Harral et al.

(10) Patent No.: US 10,563,580 B2
(45) Date of Patent: Feb. 18, 2020

(54) ENGINE SUMP WITH AIR SEPARATION FEATURES

(71) Applicant: Rolls-Royce Corporation, Indianapolis, IN (US)

(72) Inventors: Jacob W. Harral, Brownsburg, IN (US); Derek Mitchell, Brownsburg, IN (US); Phillip Burnside, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 465 days.

(21) Appl. No.: 15/596,239

(22) Filed: May 16, 2017

(65) Prior Publication Data

US 2018/0334960 A1 Nov. 22, 2018

(51) Int. Cl.
| | |
|---|---|
| *F02C 7/06* | (2006.01) |
| *F16N 39/00* | (2006.01) |
| *F01D 1/00* | (2006.01) |
| *F02C 3/04* | (2006.01) |

(52) U.S. Cl.
CPC ................ *F02C 7/06* (2013.01); *F01D 1/00* (2013.01); *F16N 39/002* (2013.01); *F02C 3/04* (2013.01); *F05D 2220/32* (2013.01); *F16N 2210/02* (2013.01)

(58) Field of Classification Search
CPC . F16N 39/002; F02C 3/04; F01D 1/00; F05D 2220/32
USPC ........................................................ 184/6.11
See application file for complete search history.

(56) References Cited

U.S. PATENT DOCUMENTS

| | | | | |
|---|---|---|---|---|
| 3,133,693 | A | * | 5/1964 | Holl ........................ F01D 11/04 184/6.11 |
| 3,378,104 | A | | 4/1968 | Venable et al. |
| 6,398,833 | B1 | | 6/2002 | Santerre et al. |
| 7,935,164 | B2 | * | 5/2011 | Fang ...................... B01D 45/14 55/385.3 |
| 7,993,425 | B2 | * | 8/2011 | Corattiyil .............. F16N 39/002 138/89 |
| 8,443,843 | B2 | | 5/2013 | Mount et al. |
| 8,621,839 | B2 | * | 1/2014 | Alecu ..................... F01D 25/20 184/6.11 |
| 9,163,558 | B1 | * | 10/2015 | Chaggar ................... F02C 6/12 |
| 2018/0334960 | A1 | * | 11/2018 | Harral ....................... F02C 7/06 |

FOREIGN PATENT DOCUMENTS

| | | |
|---|---|---|
| EP | 2157289 A2 | 2/2010 |
| JP | 2003214112 A | 7/2003 |

OTHER PUBLICATIONS

European Search Report for application No. 18169469.6-1006/3425161, dated Dec. 12, 2018, 6 pages.

\* cited by examiner

*Primary Examiner* — Michael R Mansen
*Assistant Examiner* — Mark K Buse
(74) *Attorney, Agent, or Firm* — Barnes & Thornburg LLP (57) ABSTRACT

A sump assembly for use in a gas turbine engine includes a housing and a shaft assembly. The housing is arranged about a central axis of the sump assembly to define a cavity configured to house oil and high-pressure gasses. The shaft assembly is mounted to rotate about the central axis and to direct the high-pressure gasses into the housing.

20 Claims, 6 Drawing Sheets

ENGINE SUMP WITH AIR SEPARATION FEATURES

FIELD OF THE DISCLOSURE

The present disclosure relates generally to gas turbine engines, and more specifically to sump assemblies included in lubrication systems of gas turbine engines.

BACKGROUND

Gas turbine engines are used to power aircraft, watercraft, power generators, and the like. Gas turbine engines generally include compressor wheels and turbine wheels coupled to shafts to form rotors that are supported in cases for rotation within the cases. The rotors are typically mounted on bearings that allow rotation relative to the cases. Most bearings perform best in a lubricated environment in which a lubricant reduces friction between components during rotation of the rotor.

Many gas turbine engines include lubrication systems that circulate lubricants throughout the engine. These lubrication systems may clean, cool, and distribute lubricants, such as oil, to bearings and other parts of the engine. To properly circulate lubricants through an engine, some lubrication systems control the air between lubricated cavities to encourage desired movement of the lubricant through the system.

SUMMARY

The present disclosure may comprise one or more of the following features and combinations thereof.

A sump assembly may include a sump housing, a shaft assembly, and an annular windage-suppressor shroud. The sump housing may be arranged circumferentially around a central axis of the sump assembly to define a sump cavity adapted to collect oil and high-pressure gasses. The sump housing may be formed to include a vent passageway that extends through the sump housing and opens into the sump cavity to direct the high-pressure gasses out of the sump cavity. The shaft assembly may be located in the sump cavity and configured to direct the high-pressure gasses into the sump cavity. The shaft assembly may include an inner shaft unit configured to rotate about the central axis in a first direction and an outer shaft unit configured to rotate about the central axis in a second direction. The outer shaft unit may be arranged circumferentially around at least a portion of the inner shaft unit to define a seal gap located between the outer shaft unit and the inner shaft unit. The shaft assembly may be configured to conduct the high-pressure gasses through an outlet of the seal gap radially outward away from the shaft assembly toward the sump housing.

The annular windage-suppressor shroud may be located in the sump cavity and arranged circumferentially around the shaft assembly to direct the high-pressure gasses from the outlet of the seal gap to the vent passageway formed in the sump housing such that oil located in the sump cavity is blocked from being entrained with the high-pressure gasses. The annular windage-suppressor shroud may be formed to include a guide passageway that includes a radially-inwardly opening annular guide inlet aligned axially with the outlet of the seal gap to collect the high-pressure gasses and a guide outlet aligned with the vent passageway formed in the sump housing to direct the high-pressure gasses into the vent passageway.

In some embodiments, the annular windage-suppressor shroud may include a shroud body having an inner wall and an outer wall that extend around the central axis to define the guide passageway. The inner wall may include an axially extending inner band and an inner-inlet lip that extends radially inwardly away from the inner band. The outer wall may include an axially extending outer band and an outer-inlet lip that extends radially inwardly away from the outer band. The outer band may be spaced apart radially from the inner band to locate the inner band radially between the outer band and the central axis. The inner-inlet lip may be spaced apart axially from the outer-inlet lip to define the guide inlet.

In some embodiments, the annular windage-suppressor shroud may further include a plurality of guide vanes located in the guide passageway. The plurality of guide vanes may extend radially between the inner wall and the outer wall to direct the high-pressure gasses from the guide inlet toward the guide outlet.

In some embodiments, the inner wall further may include an aft sidewall spaced apart axially from the inner-inlet lip. The aft sidewall may extend radially between the inner band and the outer band. Each guide vane may include a fore end located toward the guide inlet and an aft end spaced apart axially from the fore end and the aft sidewall to locate the aft end of the guide vane between the fore end and the aft sidewall.

In some embodiments, the annular windage-suppressor shroud may include a top end and a bottom end located about 180 degrees apart from the top end. The guide outlet may be formed toward the top end. The aft end of each of the plurality of guide vanes may be spaced apart circumferentially from the fore end toward the top end of the annular windage-suppressor shroud to direct the high-pressure gasses away from the bottom end and toward the top end.

In some embodiments, the inner wall of the shroud body may be formed to include a guide ramp that extends radially outward away from the central axis to direct the high-pressure gasses located in the guide passageway radially outward. The guide outlet may be aligned circumferentially with the guide ramp. In some embodiments, the shroud body may further include an oil deflector that extends radially inward from the inner wall of the shroud body toward the central axis to direct oil rotating along the inner wall away from the annular windage-suppressor shroud.

In some embodiments, the annular windage-suppressor shroud may include a shroud body formed to define the guide passageway and a locator system including a plurality of axial locators. The plurality of axial locators may extend axially outward away from the shroud body. The plurality of axial locators may be spaced apart circumferentially from one another about the central axis.

In some embodiments, the annular windage-suppressor shroud may include a shroud body formed to define the guide passageway and a locator system including a plurality of radial locators. The plurality of radial locators may extend radially outward away from the shroud body. The plurality of radial locators may be spaced apart circumferentially from one another about the central axis.

According to another aspect of the present disclosure, a sump assembly may include a housing, a shaft assembly, and a windage-suppressor shroud. The housing may be arranged around a central axis of the sump assembly to define a sump cavity. The housing may be formed to include a vent passageway that extends through the housing and opens into the sump cavity. The shaft assembly may be located in the sump cavity and formed to define a seal gap configured to direct high-pressure gasses radially outward away from the shaft assembly and into the sump cavity. The windage-suppressor shroud may be located in the sump cavity and arranged around the shaft assembly to direct the high-pressure gasses from the seal gap to the vent passageway formed in the housing. The windage-suppressor shroud may be formed to include a guide passageway that includes a guide inlet aligned axially with the seal gap and a guide outlet aligned with the vent passageway formed in the housing.

In some embodiments, the windage-suppressor shroud may include a shroud body having an inner wall and an outer wall that extend around the central axis to define the guide passageway. The inner wall may include an axially extending inner band and an inner-inlet lip that extends radially inwardly away from the inner band. The outer wall may include an axially extending outer band and an outer-inlet lip that extends radially inwardly away from the outer band. The outer band may be spaced apart radially from the inner band to locate the inner band radially between the outer band and the central axis. The inner-inlet lip may be spaced apart axially from the outer-inlet lip to define the guide inlet.

In some embodiments, the inner wall of the shroud body may be formed to include a guide ramp that extends radially outward away from the central axis. The guide outlet may be aligned circumferentially with the guide ramp.

In some embodiments, the shroud body may further include an oil deflector that extends radially inward from the inner wall of the shroud body toward the central axis to direct oil rotating along the inner wall away from the windage-suppressor shroud. In some embodiments, the inner band is spaced apart radially from the shaft assembly.

In some embodiments, the windage-suppressor shroud may include a shroud body and a plurality of guide vanes. The shroud body may be formed to define the guide passageway. The plurality of guide vanes may be located in the guide passageway and extend radially and axially relative to the central axis. The plurality of guide vanes may be spaced apart from one another circumferentially about the central axis.

In some embodiments, the windage-suppressor shroud may include a top end and a bottom end located about 180 degrees apart from the top end. The guide outlet may be formed toward the top end. Each guide vane may include a fore end and an aft end spaced apart axially from the fore end. The aft end of each guide vane may be spaced apart circumferentially from the fore end toward the top end of the windage-suppressor shroud.

In some embodiments, the windage-suppressor shroud may include a shroud body formed to define the guide passageway and a locator system including a plurality of axial locators. The plurality of axial locators may extend axially outward away from the shroud body. The plurality of axial locators may be spaced apart circumferentially from one another about the central axis.

In some embodiments, the windage-suppressor shroud may include a shroud body formed to define the guide passageway and a locator system including a plurality of radial locators. The plurality of radial locators may extend radially outward away from the shroud body. The plurality of radial locators may be spaced apart circumferentially from one another about the central axis.

In some embodiments, the shaft assembly may include an inner shaft unit mounted to rotate about the central axis and an outer shaft unit mounted to rotate about the central axis. The outer shaft unit may be arranged circumferentially around at least a portion of the inner shaft unit to define the seal gap.

In some embodiments, the inner shaft unit may be configured to rotate about the central axis in a first direction. The outer shaft unit may be configured to rotate about the central axis in a second direction. The second direction may be different than the first direction.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
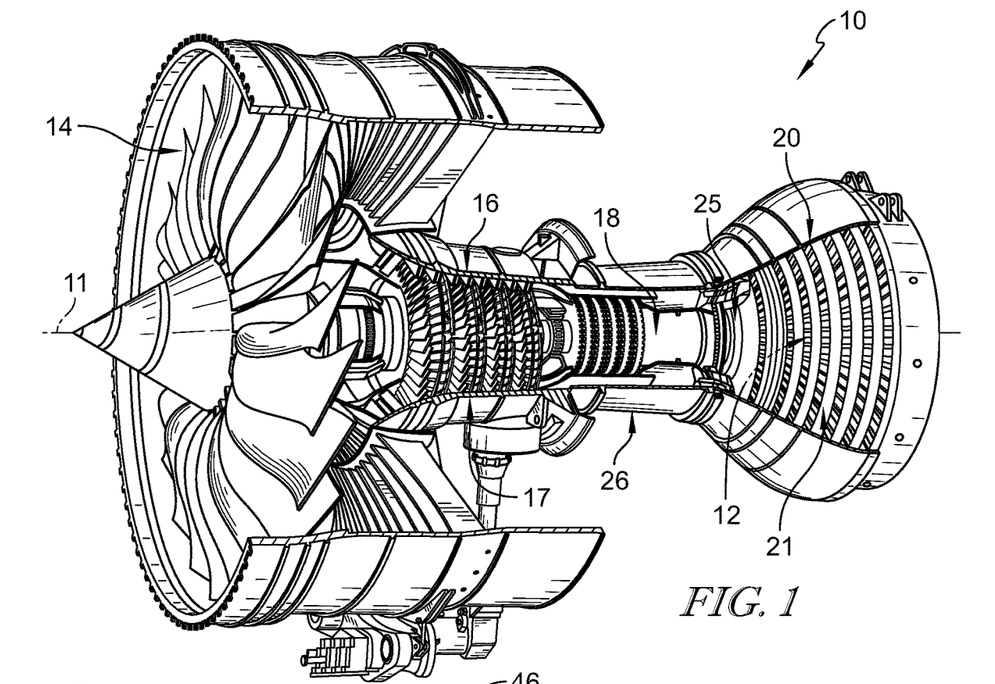
FIG. 1 is cutaway view of a gas turbine engine that includes a fan, a compressor, a combustor, a turbine, and a lubrication system configured to circulate fluids such as oil and gases to cool and lubricate components of the gas turbine engine.

An illustrative gas turbine engine 10 includes a fan 14, a compressor 16, a combustor 18, and a turbine 20 as shown in FIG. 1. The compressor 16 compresses and delivers air to the combustor 18. The combustor 18 mixes fuel with the compressed air received from the compressor 16 and ignites the fuel. The hot, high-pressure products from the burning fuel are directed into the turbine 20 and the turbine 20 extracts work to drive the compressor 16 and the fan 14.

In the illustrative embodiment, the compressor 16 includes compressor wheels 17 and the turbine 20 includes turbine wheels 21 as shown in FIG. 1. The compressor wheels 17 and the turbine wheels 21 are mounted to a shaft assembly 40 to provide a core rotor 25. The core rotor 25 is mounted in a case assembly 26 for rotation about a central axis 11 of the engine 10. To facilitate rotation of the core rotor 25 relative to the case assembly 26, the shaft assembly 40 is supported on bearings 28, 30.

Figure 2:
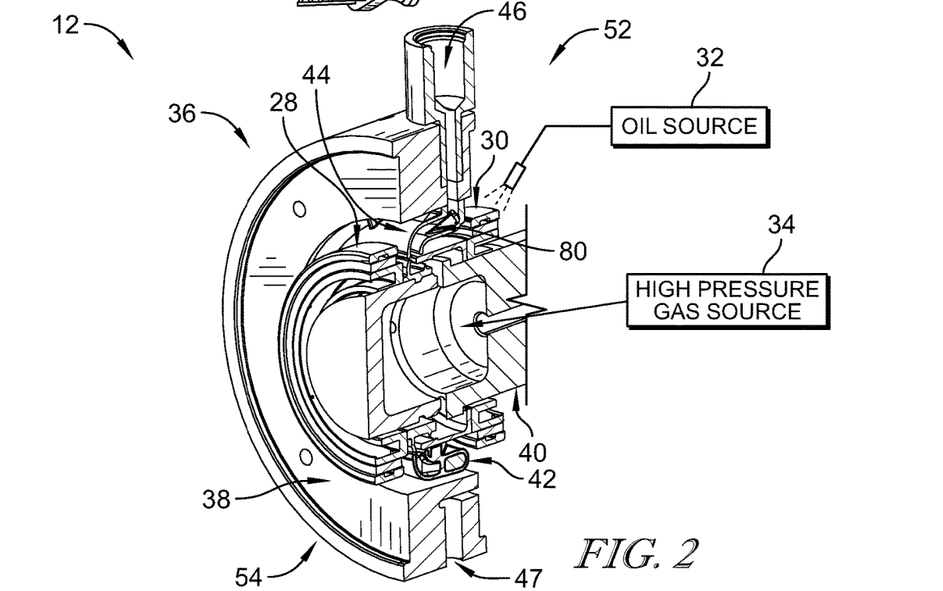
FIG. 2 is a cutaway view of a sump assembly included in the gas turbine engine, the sump assembly configured to collect the lubrication and cooling fluids and route the fluids to a gear box, gas path, or other components included in the gas turbine engine.

The bearings 28, 30 are housed in a sump assembly 36 included in a lubrication system 12 of the engine 10 as shown in FIGS. 1 and 2. The lubrication system 12 circulates oil through the sump assembly 36 to lubricate the bearings 28, 30 reducing friction between the components of the bearings 28, 30.

The lubrication system 12 illustratively includes, among other things, an oil source 32, a high-pressure gas source 34, and the sump assembly 36 as shown diagrammatically in FIG. 2. The oil source 32 stores and releases oil to the rest of the lubrication system 12. In some embodiments, the oil source 32 includes an oil tank. The illustrative high-pressure gas source 34 directs pressurized air 35 through the shaft assembly 40 and into the sump assembly 36. In some embodiments, the high-pressure gas source 34 directs pressurized air 35 through seals arranged around the bearings 23, 30 and/or shaft assembly 40 and into the sump assembly 36. The sump assembly 36 houses and provides a lubricated environment for the bearings 28, 30.

In some sump assemblies, the oil in the sump assembly may mix with the high-pressure gasses 35 and exit the sump assembly through vent passageways designed to receive the high-pressure gasses 35. The high-pressure gasses 35 may also disrupt the desired flow of the oil in the sump assembly. The illustrative sump assembly 36 includes a windage-suppressor shroud 42 configured to block oil from mixing with the high-pressure gasses 35 so that the amount of oil exiting the sump cavity 44 with the high-pressure gasses 35 through the vent passageways 46 is reduced or eliminated. In some embodiments, the windage-suppressor shroud 42 further blocks the high-pressure gasses 35 from disrupting the desired flow of oil in the sump assembly 36.

Figure 4:
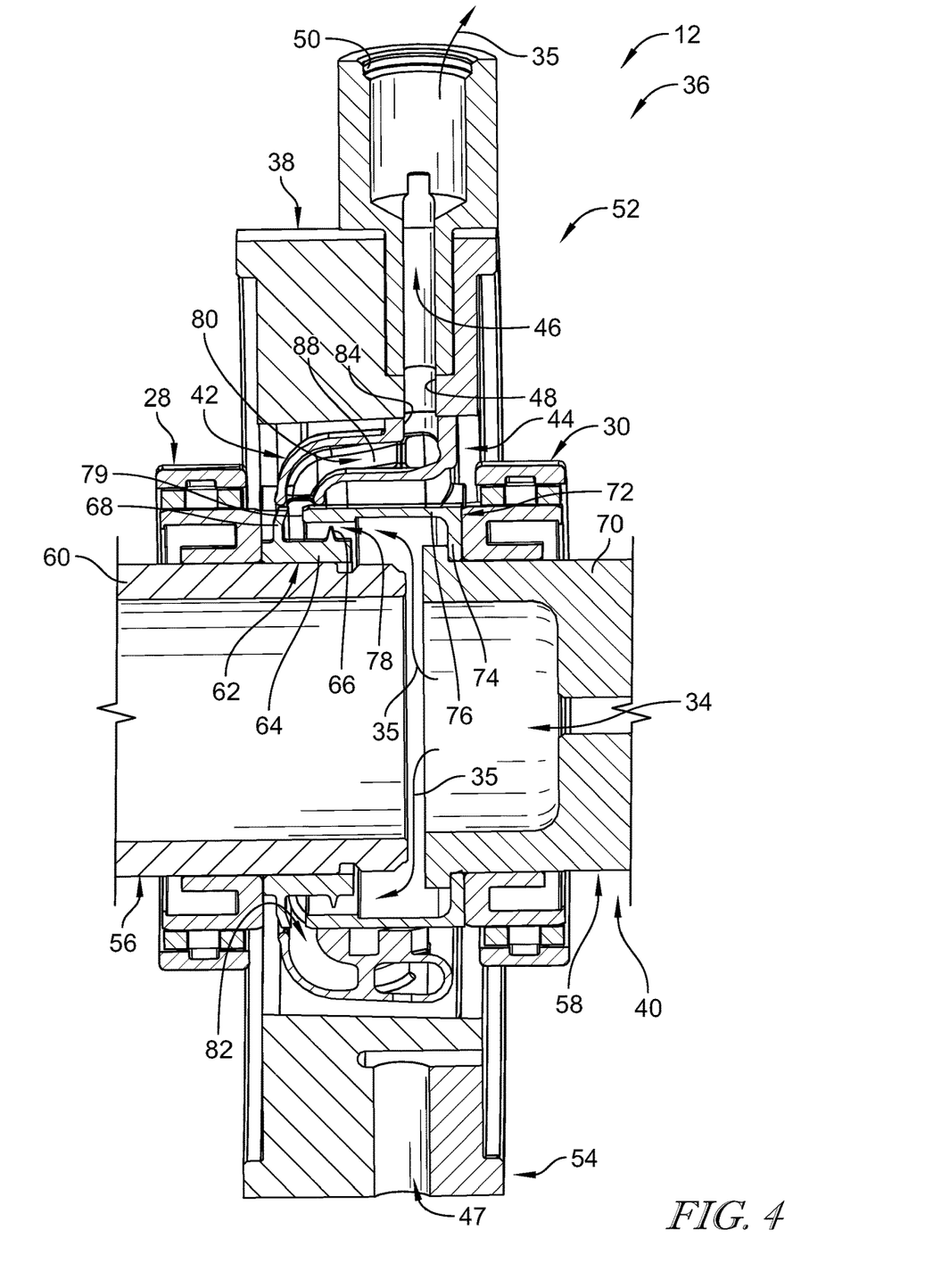
FIG. 4 is a section view of the sump assembly of FIG. 2 showing the shaft assembly, the windage-suppressor shroud arranged around the shaft assembly, and the sump housing arranged around both the shaft assembly and the windage-suppressor shroud.
Figure 5:
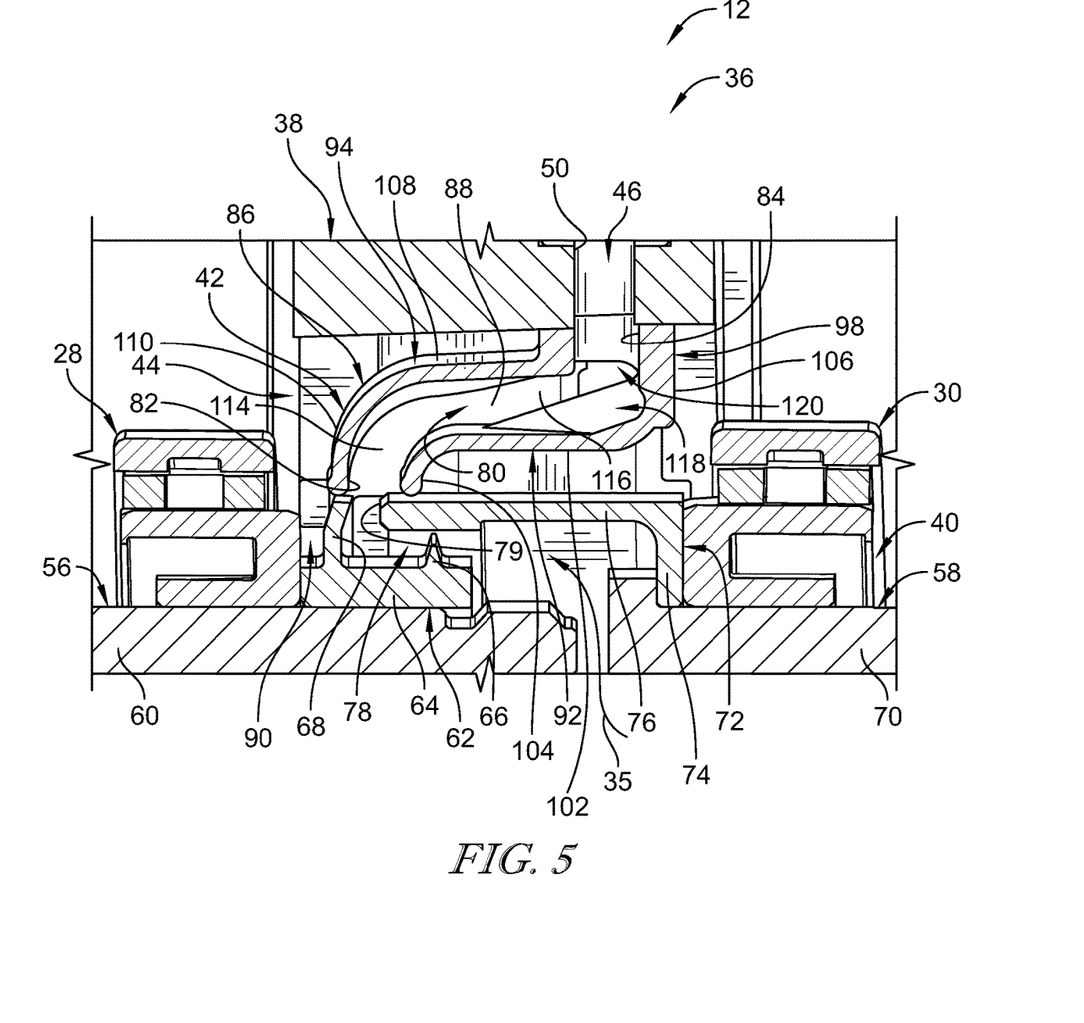
FIG. 5 is a detail view of FIG. 4 showing that the windage-suppressor shroud is arranged around the shaft assembly so that the inlet of the guide passageway formed in the shroud is aligned with an seal gap formed in the shaft assembly and the guide outlet is aligned with the vent passageway formed in the sump housing.

The windage-suppressor shroud 42 is formed to include a guide passageway 80 that directs the high-pressure gasses 35 from the shaft assembly 40, through the windage-suppressor shroud 42, and into the vent passageway 46 formed in a sump housing 38 arranged around the windage-suppressor shroud 42 and the shaft assembly 40 as shown in FIGS. 4 and 5. The guide passageway 80 includes a guide inlet 82 and a guide outlet 84. The guide inlet 82 is aligned with an outlet 79 of the seal gap 78 formed in the shaft assembly 40 to collect the high-pressure gasses 35 exiting the shaft assembly 40 through the seal gap 78. The guide outlet 84 is aligned with the vent passageway 46 formed in the sump housing 38.

Figure 3:
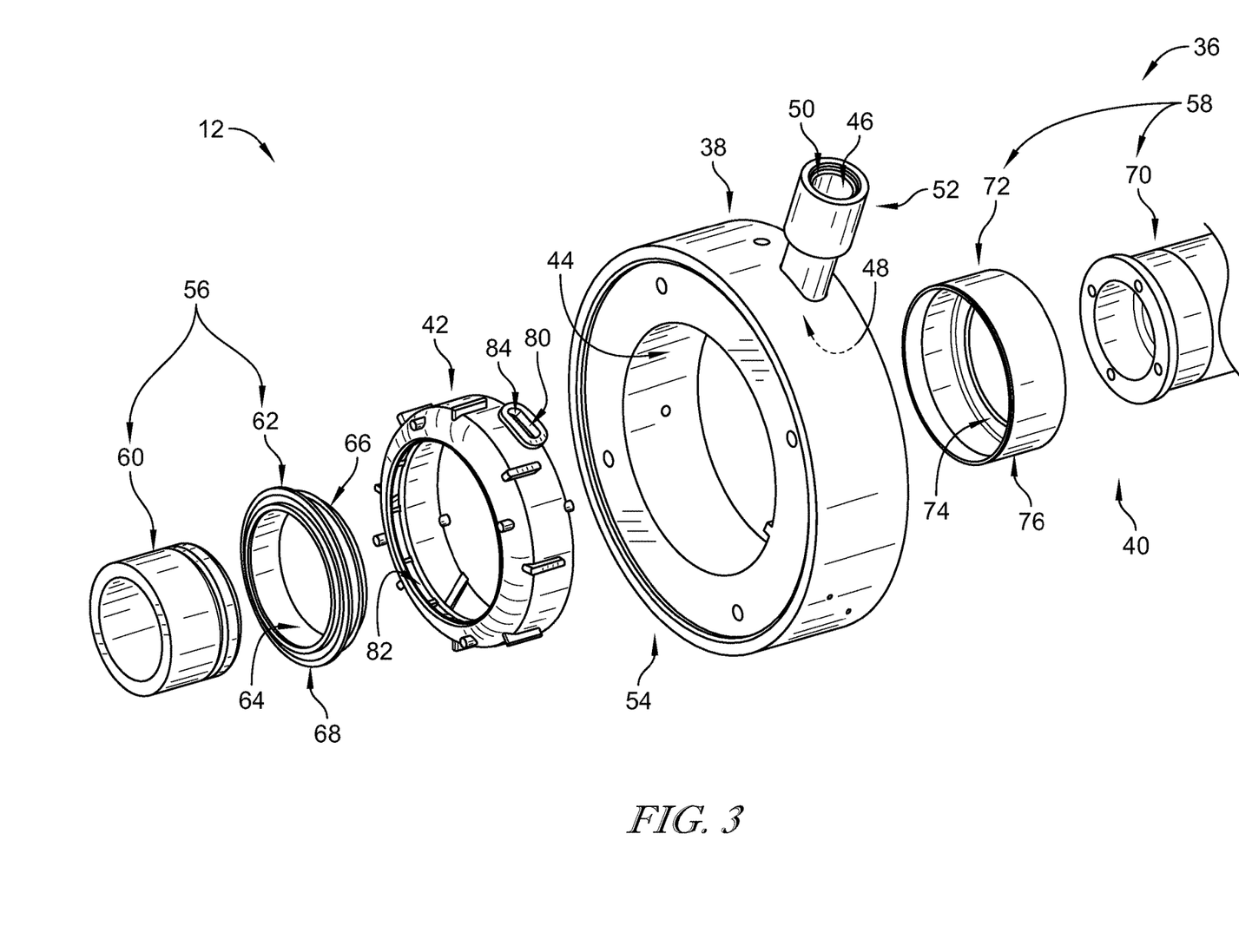
FIG. 3 is an exploded perspective of the sump assembly of FIG. 2 showing that the sump assembly includes a sump housing arranged around a central axis of the sump assembly to define a sump cavity, a shaft assembly located in the sump cavity and configured to direct high-pressure gasses into the sump cavity, and a windage-suppressor shroud configured to extend around the shaft assembly and conduct the high-pressure gasses from the shaft assembly to the sump housing without allowing oil in the sump cavity to mix with the high-pressure gasses.

Turning back to the overall sump assembly 36, the illustrative sump assembly 36 includes the sump housing 38, the shaft assembly 40, and the windage-suppressor shroud 42 as shown in FIGS. 2 and 3. The sump housing 38 is arranged around the central axis 11 of the gas turbine engine 10 to define a sump cavity 44 adapted to house and collect the oil and high-pressure gasses 35. The shaft assembly 40 extends through the sump housing 38 and conducts the high-pressure gasses 35 into the sump cavity 44. The windage-suppressor shroud 42 is configured to direct the high-pressure gasses 35 from the shaft assembly 40 to the vent passageway 46 formed in the sump housing 38 while blocking the oil in the sump cavity 44 from mixing with the high-pressure gasses and exiting the sump cavity 44 through the vent passageway 46 with the high-pressure gasses 35.

The sump assembly 36 includes a top end 52 and a bottom end 54 spaced apart vertically from the top end 52 by about 180 degrees relative to ground underlying the gas turbine engine 10 as shown in FIG. 2. In the illustrative embodiment, the vent passageway 46 is formed in the sump housing 38 toward the top end 52 of the sump assembly 36. In some embodiments, one or more vent passageways 46 are formed in struts included in the engine. The struts and vent passageways 46 may be formed at any angle relative to the top end 52 and bottom end 54 of the sump assembly 36.

The vent passageway 46 extends through the sump housing 38 to allow fluid communication through the sump housing 38 as suggested in FIG. 4. The vent passageway 46 includes a vent inlet 48 and a vent outlet 50. The vent inlet 48 opens into the sump cavity 44. The vent outlet 50 is in fluid communication with other components of the gas turbine engine 10 such as, for example, the turbine 20 and/or the vent outlet 50 is in fluid communication with the environment surrounding the gas turbine engine 10 to allow the high-pressure gasses 35 to be discharged into the environment.

In some embodiments, the sump housing 38 is formed to include a plurality of vent passageways 46. The plurality of vent passageways 46 may be spaced apart from one another axially and circumferentially. In some embodiments, the sump housing 38 is formed to include at least one scavenge drain 47. The oil is urged into the scavenge drain 47 by one or more of gravity, rotational energy of the oil, and the high-pressure gasses 35. The scavenge drain 47 directs the oil and high-pressure gasses 35 to other components of the gas turbine engine 10.

The shaft assembly 40 is coupled to the fan 14, the compressor wheels 17, and the turbine wheels 21. In the illustrative embodiment, the turbine wheels 21 impart rotational energy to the shaft assembly 40 during operation of the gas turbine engine 10. The shaft assembly 40 transmits the rotational energy to the compressor wheels 17 and the fan 14 to cause the compressor wheels 17 and the fan 14 to rotate about the central axis 11.

Portions of the shaft assembly 40 are located in the sump cavity 44 as shown in FIG. 4. The shaft assembly 40 is configured to receive the high-pressure gasses 35 from the high-pressure gas source 34 and to direct the high-pressure gasses 35 radially outward into the sump cavity 44 as suggested in FIG. 2. A portion of the high-pressure gasses 35 may be used to pressurize the sump cavity 44 for sealing and for urging the oil out of the sump cavity 44 through the scavenge drain 47. Other portions of the high-pressure gasses 35 are directed from the shaft assembly 40 to the vent passageway 46 formed in the sump housing 38.

Illustratively, the shaft assembly 40 includes an inner shaft unit 56 and an outer shaft unit 58 as shown in FIGS. 3 and 4. In other embodiments, the shaft assembly 40 may include one or more shaft units. The inner shaft unit 56 is configured to rotate in a first direction about the central axis 11. The outer shaft unit 58 is configured to rotate in a second direction about the central axis 11. In the illustrative embodiment, the second direction is different than the first direction. In other embodiments, the second direction is the same as the first direction. The inner shaft unit 56 and the outer shaft unit 58 are further configured to rotate at the same speed or different speeds relative to one another.

The outer shaft unit 58 is arranged circumferentially around at least a portion of the inner shaft unit 56 to define a seal gap 78 located between the inner shaft unit 56 and the outer shaft unit 58 as shown in FIGS. 4 and 5. The outlet 79 of the seal gap 78 is configured to direct the high-pressure gasses 35 radially outward away from the shaft assembly 40.

The inner shaft unit 56 includes an inner shaft 60 and an inner seal ring 62 as shown in FIG. 3. The inner shaft 60 is configured to be coupled to a first rotatable assembly, such as, for example, the compressor wheels 17 for rotation therewith. The inner seal ring 62 is arranged around the inner shaft 60 and cooperates with an outer sleeve 72 included in the outer shaft unit 58 to define a seal gap 78 for directing the high-pressure gasses 35 into the sump cavity 44.

The inner seal ring 62 includes a body 64, a lip 66, and a seal flange 68 as shown in FIGS. 4 and 5. The body 64 extends circumferentially about and axially along the central axis 11. The lip 66 extends radially outward away from the body 64. The seal flange 68 is axially spaced apart from the lip 66 and extends radially outward away from the body 64 toward a curved side wall 76 included in the outer shaft unit 58.

The outer shaft unit 58 includes an outer shaft 70 and the outer sleeve 72 as shown in FIGS. 3-5. The outer shaft 70 is configured to be coupled to a second rotatable assembly such as, for example, the turbine wheels 21 for rotation therewith. The outer sleeve 72 is coupled to the outer shaft 70 and extends around a portion of the inner shaft unit 56 to define the seal gap 78.

The outer sleeve 72 includes a shoulder 74 and a curved side wall 76 coupled to the shoulder 74 as shown in FIGS. 4 and 5. The shoulder 74 is coupled to the outer shaft 70 for movement therewith. The curved side wall 76 extends axially away from the shoulder 74 toward the inner shaft unit 56.

The curved side wall 76 extends around at least a portion of the body 64 included in the inner seal ring 62 of the inner shaft unit 56 as shown in FIG. 4 and the curved side wall 76 is spaced apart axially from the lip 66 included in the inner seal ring 62 to define the seal gap 78. As a result, high-pressure gasses 35 located in the shaft units 56, 58 and/or between the shaft units 56, 58 is directed out of the shaft units 56, 58 through the seal gap 78, and into the sump cavity 44.

The windage-suppressor shroud 42 is located in the sump cavity 44 and arranged circumferentially around the seal gap 78 as shown in FIGS. 4 and 5. The windage-suppressor shroud 42 directs the high-pressure gasses 35 from the outlet 79 of the seal gap 78 to the vent passageway 46 formed in the sump housing 38 while blocking oil located in the sump cavity 44 from becoming entrained with the high-pressure gasses 35. In the illustrative embodiment, the windage-suppressor shroud 42 is annular.

Figure 6:
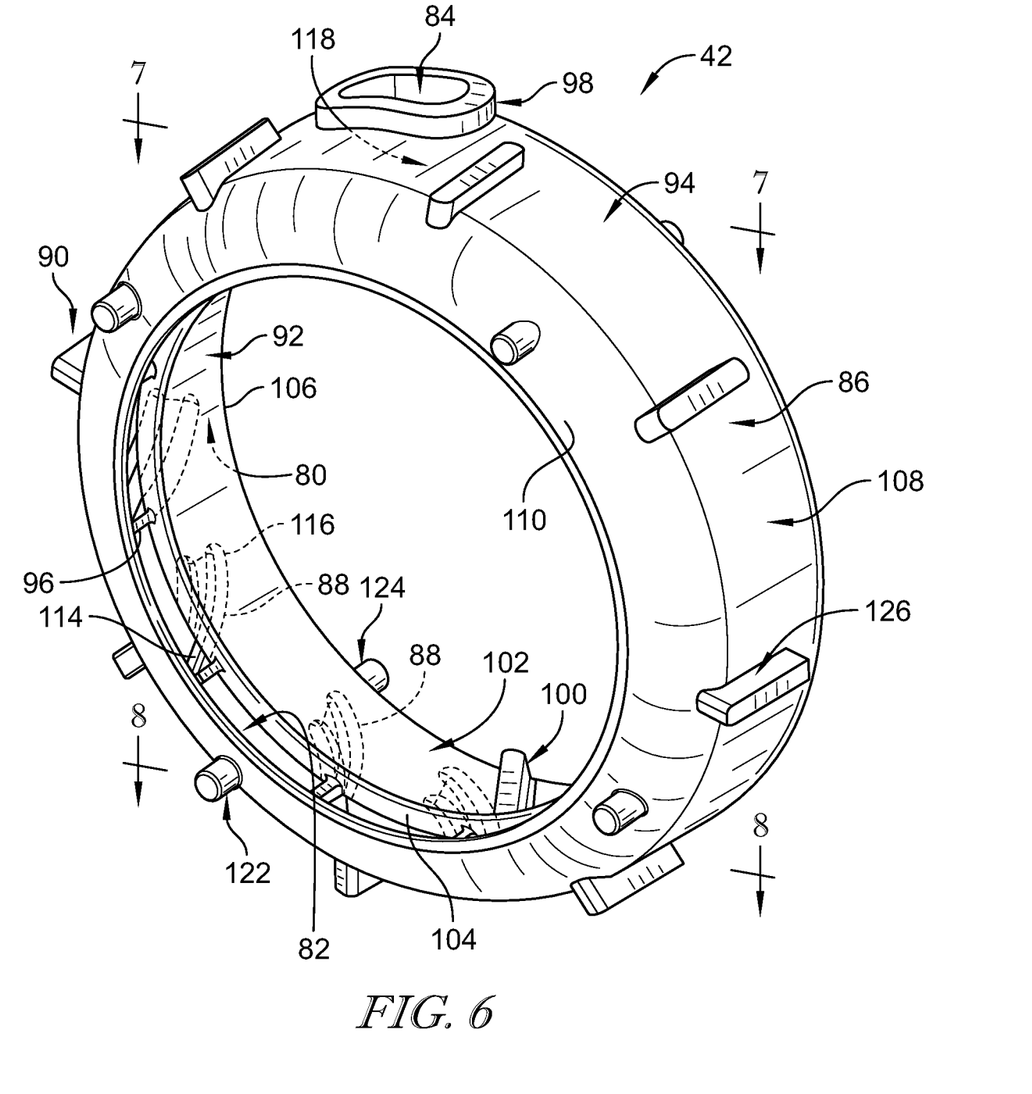
FIG. 6 is a perspective view of the windage-suppressor shroud included in the sump assembly of FIG. 2 showing that the windage-suppressor shroud is formed to define the guide passageway having the annular inlet configured to receive the high-pressure gasses from the shaft assembly and the guide outlet configured to conduct the high-pressure gasses into the vent passageway formed in the sump housing.

The windage-suppressor shroud 42 is formed to include the guide passageway 80 that directs the high-pressure gasses 35 through the windage-suppressor shroud 42 as shown in FIGS. 5 and 6. The guide passageway 80 includes a guide inlet 82 and a guide outlet 84. Illustratively, the guide inlet 82 is an annular radially-inwardly opening guide inlet 82 that is aligned axially with the outlet 79 of the seal gap 78 to collect the high-pressure gasses 35 exiting the seal gap 78. The guide outlet 84 is aligned axially and circumferentially with the vent inlet 48 included in the vent passageway 46 formed in the sump housing 38.

The windage-suppressor shroud 42 includes a shroud body 86, a plurality of guide vanes 88, and a locator system 90 as shown in FIG. 6. The shroud body 86 defines the guide passageway 80. The guide vanes 88 are located in the guide passageway 80 and direct the gasses 35 flowing through the guide passageway 80 toward the guide outlet 84. The locator system 90 positions the windage-suppressor shroud 42 axially and radially in the sump cavity 44.

The shroud body 86 includes an inner wall 92, an outer wall 94, supports 96, an outlet lip 98, and an oil deflector 100 as shown in FIG. 6. The inner wall 92 and the outer wall 94 cooperate to define the guide passageway 80. The supports 96 extend between and interconnect the inner wall 92 and the outer wall 94 at the guide inlet 82. The outlet lip 98 extends radially outward away from the outer wall 94 forms a portion of the guide outlet 84. The oil deflector 100 is coupled to the outer wall 94 and directs oil away from the windage-suppressor shroud 42.

The inner wall 92 includes an inner band 102, an inner-inlet lip 104, and an aft sidewall 106 as shown in FIGS. 5 and 6. The inner band 102 extends axially relative to the central axis 11. The inner-inlet lip 104 extends radially inwardly away from the inner band 102 toward the central axis 11. The aft sidewall 106 extends radially outward away from the inner band 102. The illustrative inner wall 92 is continuous and therefore formed without apertures to block oil from entering the guide passageway 80.

Figure 7:
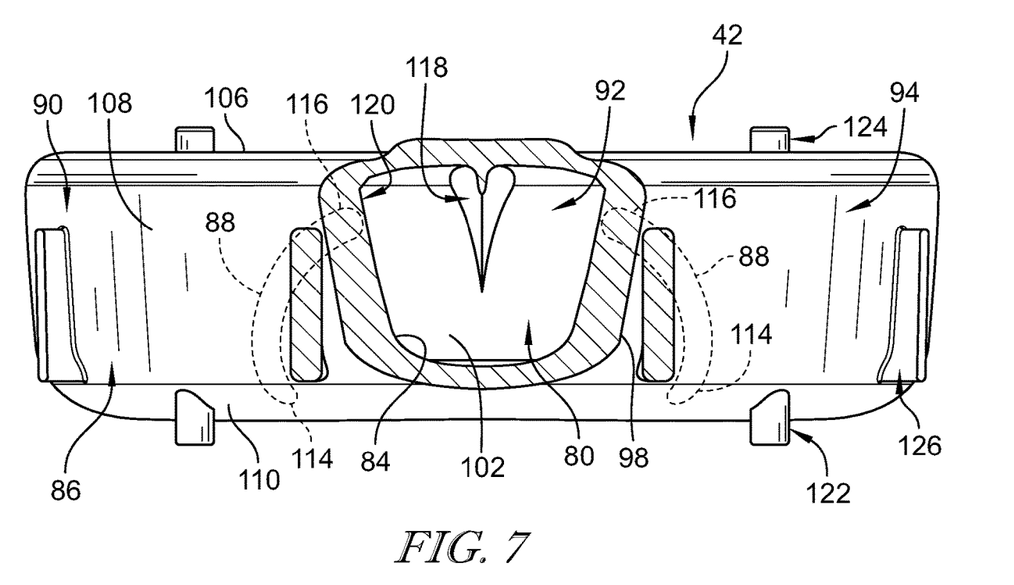
FIG. 7 is a section view taken along line 7-7 of the windage-suppressor shroud of FIG. 6 showing that a top end of the windage-suppressor shroud includes a plurality of guide vanes and a guide ramp configured to direct the high-pressure gases through the guide outlet and out of the guide passageway.

The inner band 102 is further formed to include a guide ramp 118 that extends radially outward away from the central axis 11 toward the sump housing 38 as shown in FIG. 7. The guide ramp 118 is aligned circumferentially with the guide outlet 84 and directs the high-pressure gasses 35 in the guide passageway 80 toward the guide outlet 84.

The outer wall 94 includes an outer band 108 and an outer-inlet lip 110 as shown in FIGS. 5 and 6. The outer band 108 extends axially relative to the central axis 11 and is spaced apart radially from the inner band 102 to define a portion of the guide passageway 80. The illustrative outer wall 94 is continuous and therefore formed without apertures except for a drain hole 112 formed in the outer wall 94 toward the bottom end 54 of the shroud 42.

The outer-inlet lip 110 extends radially inwardly away from the outer band 108 toward the central axis 11. The outer-inlet lip 110 is spaced apart from the inner-inlet lip 104 in the fore direction to define the guide inlet 82. The supports 96 extend between and interconnect the outer-inlet lip 110 and the inner-inlet lip 104. The aft sidewall 106 of the inner wall 92 extends between and interconnects the inner band 102 and the outer band 108.

Figure 8:
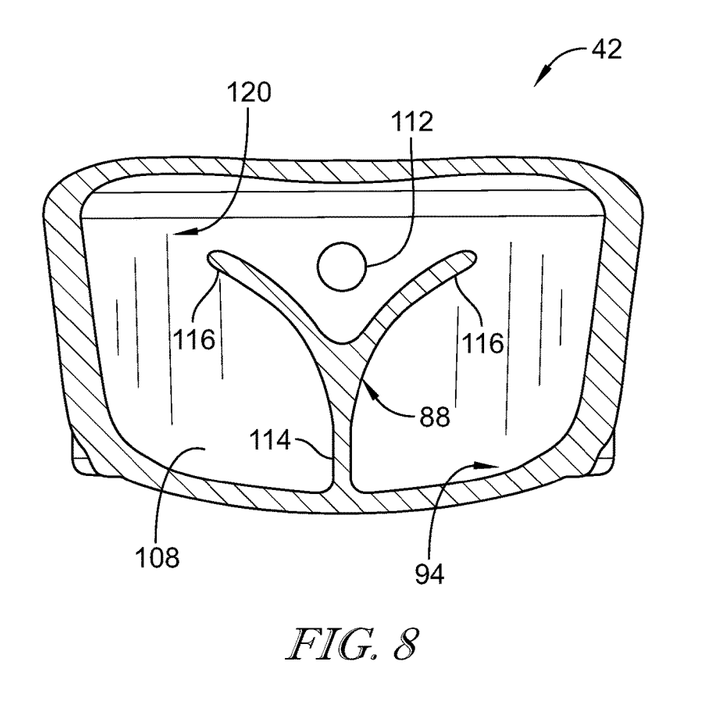
FIG. 8 is a section view taken along line 8-8 of the windage-suppressor of FIG. 6 showing that the windage-suppressor shroud includes a split guide vane and a drain hole located at a bottom end of the windage-suppressor shroud.

As shown in FIG. 8, the outer band 108 of the outer wall 94 is formed to define a drain hole 112 located toward and adjacent the bottom end 54 of the sump assembly 36. The drain hole 112 allows any oil that enters the guide passageway 80 to exit the guide passageway 80 and return to the sump cavity 44.

The oil deflector 100 extends radially inward from the inner wall 92 toward the central axis 11 as shown in FIG. 6. The oil deflector 100 extends axially between the inner-inlet lip 104 and the aft sidewall 106 and circumferentially to direct oil rotating along the inner wall 92 axially aft and away from the windage-suppressor shroud 42.

The plurality of guide vanes 88 are formed to direct the pressurized gasses 35 away from the bottom end 54 and toward the top end 52 of the sump assembly 36 as suggested in FIG. 6. The plurality of guide vanes 88 extend radially between the inner wall 92 and the outer wall 94 as shown in FIG. 5. Each guide vane has a fore end 114 located adjacent the radially-opening annular guide inlet 82 of the windage-suppressor shroud 42 and an aft end 116 spaced apart axially from the fore end 114. The aft end 116 of each guide vane 88 is spaced apart axially from the aft sidewall 106 of the inner wall 92 to form a gap 120 to allow the high-pressure gasses 35 to move toward the guide outlet 84.

In the illustrative embodiment, each guide vane 88 is curved. Illustratively, the aft end 116 of each guide vane 88 is spaced circumferentially apart from the fore end 114 toward the top end 52 of the sump assembly 36 and the guide outlet 84 and away from the bottom end 54. In the illustrative embodiment, the bottom most guide vane 88 splits and forms two aft ends 116 that are spaced apart from one another circumferentially as shown in FIG. 8. The drain hole 112 is located circumferentially between the split aft ends 116 of the guide vane 88.

The locator system 90 includes a plurality of fore axial locators 122, a plurality of aft axial locators 124, and a plurality of radial locators 126 as shown in FIG. 6. The fore and aft axial locators 122, 124 position the windage-suppressor shroud 42 axially in the sump cavity 44 relative to the bearings 28, 30. The radial locators 126 position the windage-suppressor shroud 42 radially in the sump cavity 44 relative to the bearings 28, 30.

The fore axial locators 122 are coupled to the outer-inlet lip 110 included in the outer wall 94 of the shroud body 86 as shown in FIG. 6. The fore axial locators 122 extend axially fore away from the outer-inlet lip 110 toward the bearing 28 and are configured to engage a surface such as a bearing surface to axially locate the shroud 42. The fore axial locators 122 are spaced apart circumferentially from one another about the central axis 11.

The aft axial locators 124 are coupled to the aft sidewall 106 included in the inner wall 92 of the shroud body 86 as shown in FIG. 6. The aft axial locators 124 extend axially aft away from the aft sidewall 106 toward the bearing 30 and are configured to engage a surface such as a bearing surface to axially locate the shroud 42. The aft axial locators 124 are spaced apart circumferentially from one another about the central axis 11.

The plurality of radial locators 126 are coupled to the outer wall 94 of the shroud body 86 and extend radially outward away from the central axis 11 as shown in FIGS. 5 and 6. The plurality of radial locators 126 are spaced apart circumferentially from one another about the central axis 11 and are configured to engage a surface such as a surface of the sump housing 38 to radially locate the windage-suppressor shroud 42.

The sump assembly 36 of the present disclosure may enable small engine sumps to handle high volumes of air without disrupting the oil distribution to the bearings. As a result, the sump assembly 36 may allow for scavenge while minimizing the amount of oil carried out of the sump assembly 36 through the vents. The high velocity air exiting the seal gap between two rotating shafts is guided to a vent without allowing the high velocity air to mix in with the bearing oil in the sump cavity. Internal turning vanes in the windage-suppressor shroud 42 guide the high-pressure air around the annulus to the vent.

Without a windage-suppressor shroud 42, air may enter a sump cavity, which acts as a plenum, and form multiple vortices as it flows around the internal sump components in route to the vents. The vortices may entrain sump oil, which is ejected through relatively high-velocity vent lines instead of collecting and exiting through the scavenge ports. The large amount of air and oil flowing through the vent lines may cause the engine to include a breather commensurate with that flow. Such a breather may be much larger than breathers used in similar engines due to the large amount of air and oil flowing through the vent lines.

In some embodiments, the windage-suppressor shroud 42 may be designed receive between about 90 percent and about 95 percent of the air flow through the seal gap or intershaft seal. As a result, the vent may be relatively oil-free, such that the air in the vent may be routed back to the turbine or exhaust sections of the engine. Thus, the size of the gearbox breather may be minimized, lowering weight.

Some engine sumps may use labyrinth seals with abradable coatings and/or a variety of carbon seal technologies. Engine architecture, operating deflections, and secondary air flow system may help determine the type of seals and seal clearances to use. They may also determine potential for seal wear or failure. Engine sumps which handle large air flows may include one or more of the following features: geometrically large sump with sufficient internal space for the air-oil separation; large vent lines to slow the vent air down such that it will not entrain oil; and/or vent air routed to the gearbox, which may result in a large gearbox breather to accommodate the high flow air and oil scavenges capable of handling the extra oil. Gearboxes may also use air-oil separators and oil tanks may include breathers. Insufficient space in engine sumps may make it difficult to properly manage the air and oil systems. In such sumps, air may entrain the oil and carry it out the vents.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A sump assembly for use in a gas turbine engine, the sump assembly comprising a sump housing arranged circumferentially around a central axis of the sump assembly to define a sump cavity adapted to collect oil and high-pressure gasses, the sump housing formed to include a vent passageway that extends through the sump housing and opens into the sump cavity to direct the high-pressure gasses out of the sump cavity, a shaft assembly located in the sump cavity and configured to direct the high-pressure gasses into the sump cavity, the shaft assembly including an inner shaft unit configured to rotate about the central axis in a first direction and an outer shaft unit configured to rotate about the central axis in a second direction, the outer shaft unit arranged circumferentially around at least a portion of the inner shaft unit to define a seal gap located between the outer shaft unit and the inner shaft unit, and the shaft assembly configured to conduct the high-pressure gasses through an outlet of the seal gap radially outward away from the shaft assembly toward the sump housing, and an annular windage-suppressor shroud located in the sump cavity and arranged circumferentially around the shaft assembly to direct the high-pressure gasses from the outlet of the seal gap to the vent passageway formed in the sump housing such that oil located in the sump cavity is blocked from being entrained with the high-pressure gasses, the annular windage-suppressor shroud formed to include a guide passageway that includes a radially-inwardly opening annular guide inlet aligned axially with the outlet of the seal gap to collect the high-pressure gasses and a guide outlet aligned with the vent passageway formed in the sump housing to direct the high-pressure gasses into the vent passageway.

2. The sump assembly of claim 1, wherein the annular windage-suppressor shroud includes a shroud body having an inner wall and an outer wall that extend around the central axis to define the guide passageway, the inner wall includes an axially extending inner band and an inner-inlet lip that extends radially inwardly away from the inner band, the outer wall includes an axially extending outer band and an outer-inlet lip that extends radially inwardly away from the outer band, the outer band is spaced apart radially from the inner band to locate the inner band radially between the outer band and the central axis, and the inner-inlet lip is spaced apart axially from the outer-inlet lip to define the guide inlet.

3. The sump assembly of claim 2, wherein the annular windage-suppressor shroud further includes a plurality of guide vanes located in the guide passageway and the plurality of guide vanes extend radially between the inner wall and the outer wall to direct the high-pressure gasses from the guide inlet toward the guide outlet.

4. The sump assembly of claim 3, wherein the inner wall further includes an aft sidewall spaced apart axially from the inner-inlet lip, the aft sidewall extends radially between the inner band and the outer band, each guide vane includes a fore end located toward the guide inlet and an aft end spaced apart axially from the fore end and the aft sidewall to locate the aft end of the guide vane between the fore end and the aft sidewall.

5. The sump assembly of claim 4, wherein the annular windage-suppressor shroud includes a top end and a bottom end located about 180 degrees apart from the top end, the guide outlet is formed toward the top end, and the aft end of each of the plurality of guide vanes is spaced apart circumferentially from the fore end toward the top end of the annular windage-suppressor shroud to direct the high-pressure gasses away from the bottom end and toward the top end.

6. The sump assembly of claim 2, wherein the inner wall of the shroud body is formed to include a guide ramp that extends radially outward away from the central axis to direct the high-pressure gasses located in the guide passageway radially outward and the guide outlet is aligned circumferentially with the guide ramp.

7. The sump assembly of claim 2, wherein the shroud body further includes an oil deflector that extends radially inward from the inner wall of the shroud body toward the central axis to direct oil rotating along the inner wall away from the annular windage-suppressor shroud.

8. The sump assembly of claim 1, wherein the annular windage-suppressor shroud includes a shroud body formed to define the guide passageway and a locator system including a plurality of axial locators, the plurality of axial locators extend axially outward away from the shroud body, and the plurality of axial locators are spaced apart circumferentially from one another about the central axis.

9. The sump assembly of claim 1, wherein the annular windage-suppressor shroud includes a shroud body formed to define the guide passageway and a locator system including a plurality of radial locators, the plurality of radial locators extend radially outward away from the shroud body, and the plurality of radial locators are spaced apart circumferentially from one another about the central axis.

10. A sump assembly for use in a gas turbine engine, the sump assembly comprising
a housing arranged around a central axis of the sump assembly to define a sump cavity, the housing formed to include a vent passageway that extends through the housing and opens into the sump cavity,
a shaft assembly located in the sump cavity and formed to define a seal gap configured to direct high-pressure gasses radially outward away from the shaft assembly and into the sump cavity, and
a windage-suppressor shroud located in the sump cavity and arranged around the shaft assembly to direct the high-pressure gasses from the seal gap to the vent passageway formed in the housing, the windage-suppressor shroud formed to include a guide passageway that includes a guide inlet aligned axially with the seal gap and a guide outlet aligned with the vent passageway formed in the housing.

11. The sump assembly of claim 10, wherein the windage-suppressor shroud includes a shroud body having an inner wall and an outer wall that extend around the central axis to define the guide passageway, the inner wall includes an axially extending inner band and an inner-inlet lip that extends radially inwardly away from the inner band, the outer wall includes an axially extending outer band and an outer-inlet lip that extends radially inwardly away from the outer band, the outer band is spaced apart radially from the inner band to locate the inner band radially between the outer band and the central axis, and the inner-inlet lip is spaced apart axially from the outer-inlet lip to define the guide inlet.

12. The sump assembly of claim 11, wherein the inner wall of the shroud body is formed to include a guide ramp that extends radially outward away from the central axis and the guide outlet is aligned circumferentially with the guide ramp.

13. The sump assembly of claim 11, wherein the shroud body further includes an oil deflector that extends radially inward from the inner wall of the shroud body toward the central axis to direct oil rotating along the inner wall away from the windage-suppressor shroud.

14. The sump assembly of claim 11, wherein the inner band is spaced apart radially from the shaft assembly.

15. The sump assembly of claim 10, wherein the windage-suppressor shroud includes a shroud body and a plurality of guide vanes, the shroud body is formed to define the guide passageway, the plurality of guide vanes are located in the guide passageway and extend radially and axially relative to the central axis, and the plurality of guide vanes are spaced apart from one another circumferentially about the central axis.

16. The sump assembly of claim 15, wherein the windage-suppressor shroud includes a top end and a bottom end located about 180 degrees apart from the top end, the guide outlet is formed toward the top end, each guide vane includes a fore end and an aft end spaced apart axially from the fore end, and the aft end of each guide vane is spaced apart circumferentially from the fore end toward the top end of the windage-suppressor shroud.

17. The sump assembly of claim 10, wherein the windage-suppressor shroud includes a shroud body formed to define the guide passageway and a locator system including a plurality of axial locators, the plurality of axial locators extend axially outward away from the shroud body, and the plurality of axial locators are spaced apart circumferentially from one another about the central axis.

18. The sump assembly of claim 10, wherein the windage-suppressor shroud includes a shroud body formed to define the guide passageway and a locator system including a plurality of radial locators, the plurality of radial locators extend radially outward away from the shroud body, and the plurality of radial locators are spaced apart circumferentially from one another about the central axis.

19. The sump assembly of claim 10, wherein the shaft assembly includes an inner shaft unit mounted to rotate about the central axis and an outer shaft unit mounted to rotate about the central axis, the outer shaft unit is arranged circumferentially around at least a portion of the inner shaft unit to define the seal gap.

20. The sump assembly of claim 19, wherein the inner shaft unit is configured to rotate about the central axis in a first direction, the outer shaft unit is configured to rotate about the central axis in a second direction, and the second direction is different than the first direction.

* * * * *